United States Patent [19]
Nishimoto

[11] Patent Number: 5,259,473
[45] Date of Patent: Nov. 9, 1993

[54] ELECTRIC POWER STEERING APPARATUS

[75] Inventor: Mitsuhiko Nishimoto, Yoshino, Japan

[73] Assignee: Koyo Seiko Co., Ltd., Osaka, Japan

[21] Appl. No.: 951,576

[22] Filed: Sep. 25, 1992

[30] Foreign Application Priority Data

Oct. 10, 1991 [JP] Japan ................... 3-292323
Oct. 22, 1991 [JP] Japan ................... 3-303991
Oct. 22, 1991 [JP] Japan ................... 3-303992

[51] Int. Cl.⁵ .................................. B62D 5/04
[52] U.S. Cl. .............................. 180/79.1; 180/142; 364/424.05
[58] Field of Search ................ 180/79.1, 141, 142; 364/424.05

[56] References Cited

U.S. PATENT DOCUMENTS

| | | | |
|---|---|---|---|
| 4,621,327 | 11/1986 | Dolph et al. | 364/424 |
| 4,869,334 | 9/1989 | Marumoto et al. | 180/79.1 |
| 4,895,216 | 1/1990 | Fusimi et al. | 180/79.1 |
| 5,027,276 | 6/1991 | Morishita et al. | 180/79.1 X |
| 5,101,922 | 4/1992 | Ohmura | 180/79.1 |

FOREIGN PATENT DOCUMENTS

| | | |
|---|---|---|
| 0125918 | 11/1984 | European Pat. Off. . |
| 381087 | 11/1988 | Fed. Rep. of Germany . |
| 2613680 | 4/1988 | France . |
| 0012460 | 1/1987 | Japan .................... 180/79.1 |
| 62-244759 | 10/1987 | Japan . |

Primary Examiner—Margaret A. Focarino
Assistant Examiner—C. Mattix
Attorney, Agent, or Firm—Darby & Darby

[57] ABSTRACT

An electric power steering apparatus having a main control section and a sub control section both for performing a control relating to a steering assistance, wherein the two control sections mutually detect abnormality each other by monitoring the cycle of a watchdog pulse signal that one control section sends to the other. When abnormality is detected in one or other of the control sections, the steering assistance is disabled. After the abnormal control section is restored to a normal operating state, the disabled steering assistance is released from the disabled state only after the vehicle speed has been reduced to zero. The sub control section detects abnormality in the main control section by performing simple arithmetic operations such as comparison of information relating to the inputs/outputs to and from the main control section.

7 Claims, 14 Drawing Sheets

ELECTRIC POWER STEERING APPARATUS

BACKGROUND OF THE INVENTION

1. Field of the Invention

The present invention relates to an electric power steering apparatus for assisting the force required to turn the steering wheel of a vehicle.

2. Description of the Related Art

An electric power steering apparatus has been developed which uses a vehicle speed sensor to measure the traveling speed of the vehicle and a torque sensor to measure the steering torque applied at the steering wheel. In the electric power steering apparatus of this type, when the steering torque measured exceeds a predetermined dead zone, a steering assisting motor is driven by a driving current of the magnitude determined according to the measured steering torque and the measured vehicle speed, and the rotational force of the motor is used to provide power to assist the force required to steer the vehicle, thereby providing a comfortable steering feel to the driver. The steering assistance is controlled by a controller (hereinafter called the CPU). One such electric power steering apparatus employs a dual CPU configuration to assure the system safety against malfunctions, such as runaway, of the CPU.

The electric power steering apparatus with a dual CPU configuration has a main CPU for controlling the steering assisting force and a sub CPU for detecting failure of the main CPU by monitoring the inputs and outputs to and from the main CPU, so that upon detection of failure of the main CPU, the sub CPU initiates a fail-safe control, involving the stopping of the motor and so on, to secure the system safety.

In the dual CPU system, it is necessary to separately monitor the basic operation of each individual CPU. To achieve this, each of the main and sub CPUs is connected to a separate watchdog monitoring circuit which measures the frequency of watchdog pulses generated at a fixed repetition rate from the CPU connected to it and compares the measured frequency with a reference value to detect failure in the CPU operation. When any abnormality in the main or sub CPU operation is detected by the associated watchdog monitoring circuit, the fail-safe control is performed.

However, the above electric power steering apparatus having separate watchdog monitoring circuits for the main and sub CPUs has the problem of increasing the production cost because of the provision of the two watchdog monitoring circuits in the form of hardware in addition to the main and sub CPUs.

SUMMARY OF THE INVENTION

It is an object of the invention to provide an electric power steering apparatus wherein each CPU is provided with an internal watchdog monitoring function, thereby achieving a reduction in the production cost of the apparatus.

It is another object of the invention to provide an electric power steering apparatus wherein when an abnormal CPU is restored to a normal operating state, the apparatus is released from a fail-safe control only after the vehicle is stopped, thereby stabilizing the system operating condition associated with the fail-safe control operation.

It is a further object of the invention to provide an electric power steering apparatus which allows the use of a sub CPU having a lower processing capacity than that of the main CPU by simplifying the operation processing performed by the sub CPU, thereby achieving a reduction in the production cost of the apparatus.

In the electric power steering apparatus of the invention, the main CPU monitors the cycle of a watchdog pulse signal generated from the sub CPU and detects any abnormality in the operation of the sub CPU on the basis of the monitored result, while the sub CPU monitors the cycle of a watchdog pulse signal generated from the main CPU and detects any abnormality in the operation of the main CPU on the basis of the monitored result. In this manner the two CPUs each monitor the cycle of the watchdog pulse signal generated from the other so that any abnormality occurred in the main CPU is detected by the sub CPU, and vice versa. This eliminates the need to connect hardware with respective CPU in order to monitor the cycle of the watchdog pulse signal generated from each CPU. When abnormality is detected in one or other of the CPUs, the steering assistance is disabled to prevent dangerous steering assisting action that may result from malfunctioning of the CPU. Furthermore, when abnormality is detected in one or other of the CPUs, the abnormal CPU is reset to isolate it from the control relating to the steering assistance, thus preventing dangerous steering assisting action that may result from malfunctioning of the CPU.

In one preferred mode of the electric power steering apparatus of the invention, even if the abnormal CPU is restored to a normal operating state, the steering assistance, once disabled, can be enabled only when the vehicle speed is at zero; that is, once the steering assistance is disabled as a result of detection of failure in the CPU under monitor, the steering assistance will not be restarted while the vehicle is in motion. This serves to prevent unstable traveling conditions which would be caused by repetitive activation and deactivation of the steering assistance.

Generally, in an electric power steering apparatus, the dangerous steering assisting situation that may result from malfunctioning of the CPU for controlling the motor is represented by the following three states: the first state in which steering assisting force is exerted in a steering situation where no steering assisting force is needed; the second state in which steering assisting force is exerted in a direction opposite to the steering direction of the steering wheel; and the third state in which excessive steering assisting force is exerted. In another preferred mode of the electric power steering apparatus of the invention, the sub CPU monitors the main CPU for the occurrence of any of these three states to detect abnormality in the operation of the main CPU. Therefore, the sub CPU is only required to perform simple arithmetic operations, and accordingly, the configuration of the sub CPU can be simplified.

The above and further objects and features of the invention will more fully be apparent from the following detailed description with accompanying drawings.

DESCRIPTION OF THE PREFERRED EMBODIMENTS

The preferred embodiments of the invention will now be described in detail with reference to the accompanying drawings.

EMBODIMENT 1

Figure 1:
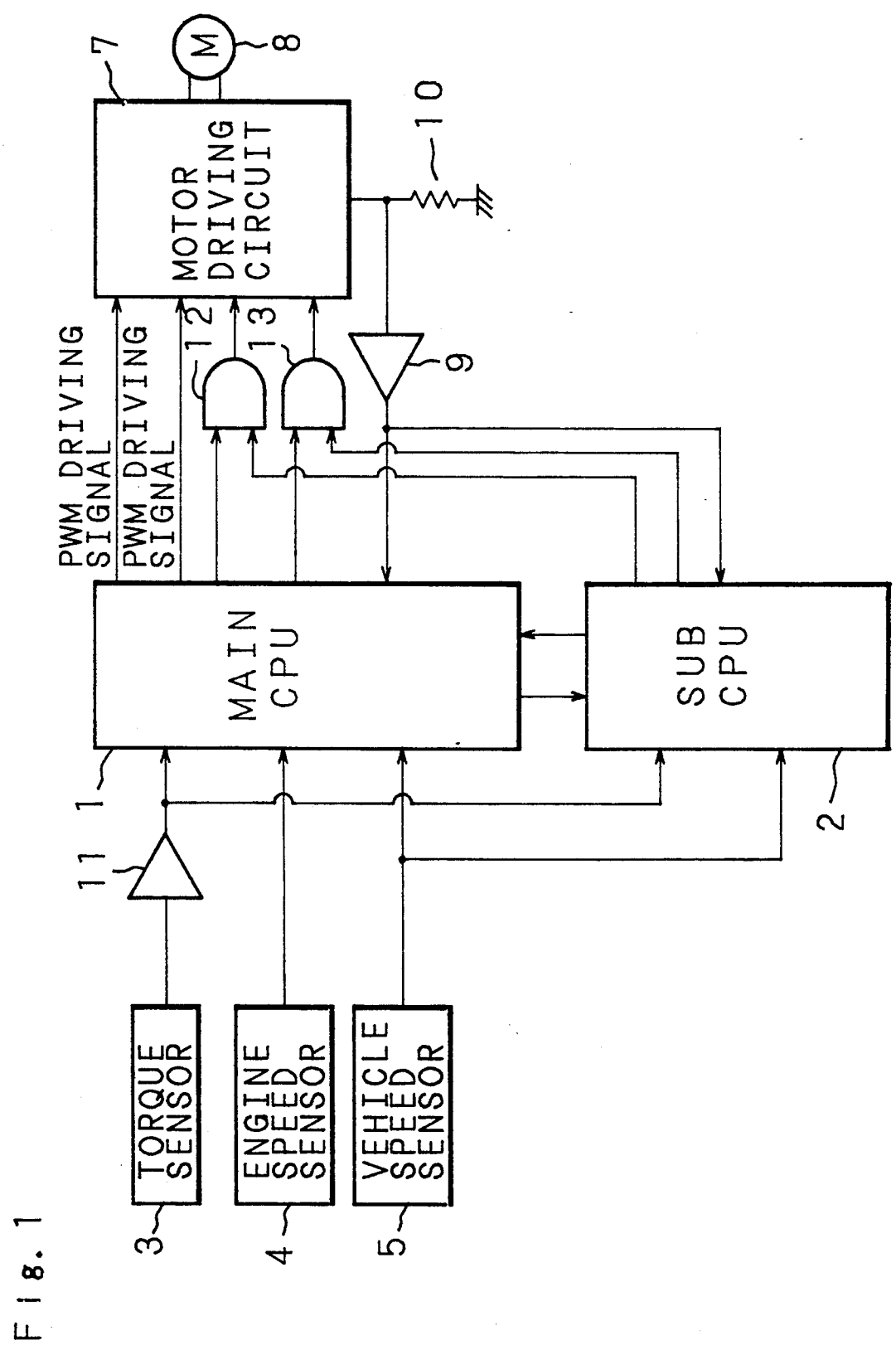
FIG. 1 is a block diagram showing the configuration of an electric power steering apparatus according to a first and a second embodiment of the present invention.

FIG. 1 is a block diagram showing the configuration of an electric power steering apparatus according to the first embodiment of the invention. The reference numeral 1 designates a main CPU responsible for a steering assistance control, and the operating state of the main CPU 1 is monitored by a sub CPU 2. The main CPU 1 sends a watchdog pulse signal to the sub CPU 2, based on which signal the sub CPU 2 monitors the basic operating state of the main CPU 1. On the other hand, the sub CPU 2 sends a watchdog pulse signal to the main CPU 1, based on which signal the main CPU 1 monitors the basic operating state of the sub CPU 2.

Other signals supplied to the main CPU 1 are: a torque detection signal representing a steering torque applied at the steering wheel, the steering torque being detected by a torque sensor 3 and amplified through an amplifier 11; an engine speed detection signal from an engine speed sensor 4 which detects the number of engine revolutions; and a vehicle speed detection signal from a vehicle speed sensor 5 which detects the traveling speed of the vehicle.

The torque detection signal amplified by the amplifier 11 and representing the result of detection by the torque sensor 3 and the vehicle speed detection signal from the car speed sensor 5 are also supplied to the sub CPU 2.

Based on the thus supplied torque detection signal and vehicle speed detection signal, the main CPU 1 performs prescribed operations to obtain a driving current to drive a motor 8 for the steering assistance as well as the rotating direction of the motor 8. The main CPU 1 then sends a PWM driving signal, corresponding to the driving current, to a motor driving circuit 7. When the obtained rotating direction of the motor 8 is clockwise, the main CPU 1 applies a high logic signal to a first AND gate 12 which then supplies a clockwise rotation signal to the motor driving circuit 7 to drive the motor 8 in clockwise direction. On the other hand, when the obtained rotating direction of the motor 8 is counterclockwise, the main CPU 1 applies a high logic signal to a second AND gate 13 which then supplies a counterclockwise rotation signal to the motor driving circuit 7 to drive the motor 8 in counterclockwise direction. Besides the control operations as described above, the main CPU 1 performs a control to monitor the basic operation of the sub CPU 2 for detection of failure, as will be described later, based on the watchdog pulse signal supplied from the sub CPU 2.

Based on the supplied torque detection signal and vehicle speed detection signal, the sub CPU 2 performs the same operations as those performed in the main CPU 1, to obtain a driving current to drive the motor 8 as well as the rotating direction of the motor 8, and monitors the control operations of the main CPU 1 for detection of failure, as will be described later. At the same time, the sub CPU 2 performs a control to monitor the basic operation of the main CPU 1 for detection of failure, based on the watchdog pulse signal supplied from the main CPU 1, and supplies logic signals to the first AND gate 12 and second AND gate 13.

When the logic signals inputted from the main CPU 1 and sub CPU 2 are both at a high level, the first AND gate 12 outputs a high clockwise rotation signal which is given to the motor driving circuit 7. On the other hand, when the logic signals inputted from the main CPU 1 and sub CPU 2 are both at a high level, the second AND gate 13 outputs a high counterclockwise rotation signal which is given to the motor driving circuit 7.

The motor driving circuit 7 determines the rotating direction of the motor 8 based on the logic states of the clockwise and counterclockwise rotation signals, and drives the motor 8 based on the PWM driving signal supplied from the main CPU 1. When the logic signals supplied from the first AND gate 12 and second AND gate 13 are both low, the motor driving circuit 7 disables the driving of the motor 8. The current for driving the motor 8 is detected by a current detecting resistor 10, and the detected result is given to the main CPU 1, as well as to the sub CPU 2, via an amplifier 9.

Figure 2:
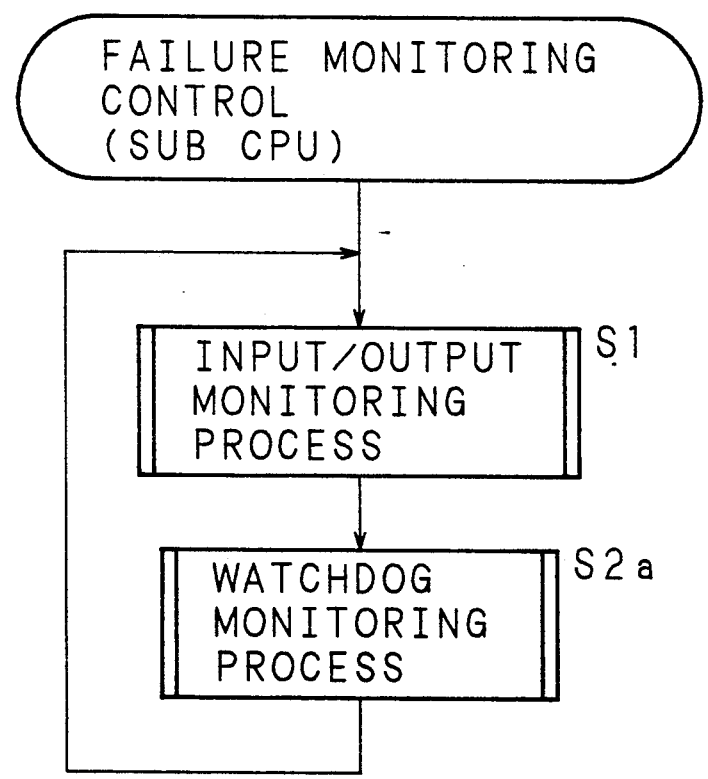
FIG. 2 is a flowchart illustrating a main routine for a failure monitoring control that the sub CPU performs on the main CPU according to the first embodiment of the invention.
Figure 3:
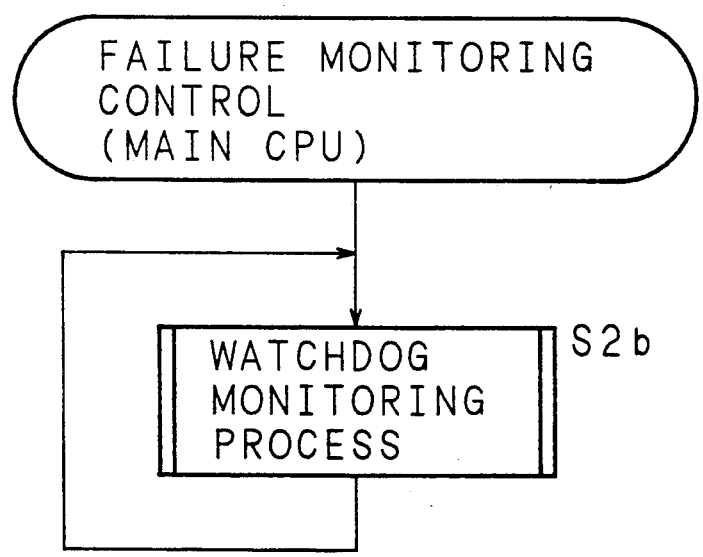
FIG. 3 is a flowchart illustrating a main routine for a failure monitoring control that the main CPU performs on the sub CPU according to the first embodiments of the invention.

Next, we will describe the failure monitoring control operations performed by the main CPU 1 and sub CPU 2 in the electric power steering apparatus of the above configuration. FIG. 2 is a flowchart illustrating a main routine for failure monitoring control that the sub CPU 2 performs on the main CPU 1. The sub CPU 2 sequentially executes a subroutine for an input/output monitoring process (step S1) and a subroutine for a watchdog monitoring process (step S2a). FIG. 3 is a flowchart illustrating a main routine for failure monitoring control that the main CPU 1 performs on the sub CPU 2. The main CPU 1 executes a subroutine for a watchdog monitoring process (step S2b).

First, we will describe the subroutine for an input/output monitoring process (step S1) performed in the sub CPU 2. In the input/output monitoring process in which the sub CPU 2 monitors the inputs/outputs to and from the main CPU 1, the sub CPU 2 performs the same operations as those performed in the main CPU 1 for the steering assistance control, and compares the results with the results produced by the main CPU 1 for the steering assistance control, the result of the comparison being used for the detection of abnormality in the main CPU 1. Parameters used for the comparison include the current value for driving the motor 8, the rotating direction of the motor 8, and so on. Of these parameters, the current value for driving the motor 8 is taken as an example to explain the input/output monitoring process.

Figure 4:
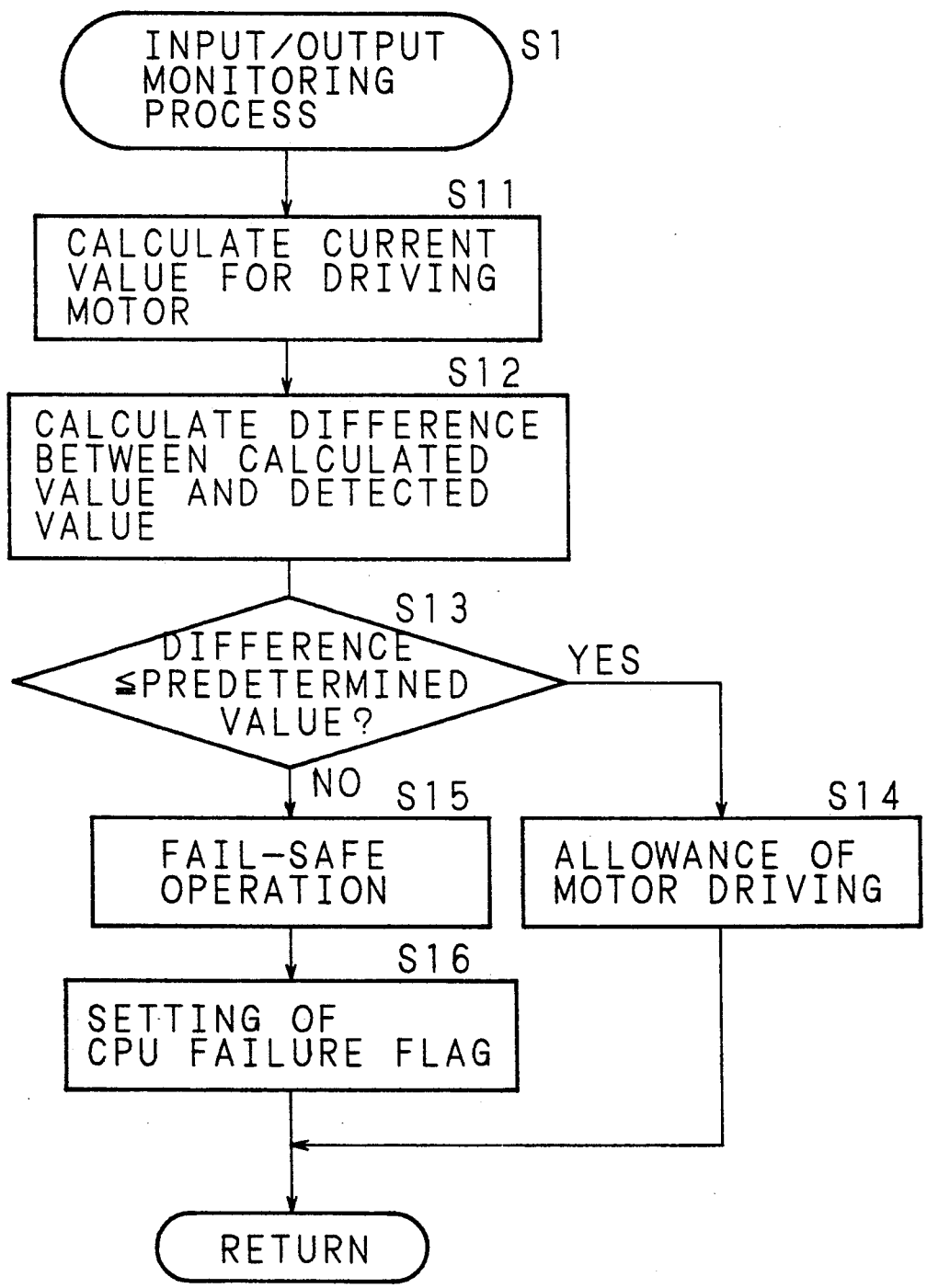
FIG. 4 is a flowchart illustrating a subroutine for an input/output monitoring process performed in the sub CPU according to the first and second embodiments of the invention.

FIG. 4 is a flowchart illustrating the processing contents of the input/output monitoring subroutine (step S1) executed in the sub CPU 2. First, the same operation as in the main CPU 1 is performed to calculate the current value for driving the motor 8 (step S11), and then, the difference between the calculated current value and the supplied current detection value for driving the motor 8 is obtained (step S12).

Next, it is determined whether the difference is not greater than a predetermined value (step S13). If it is determined that the difference is not greater than the predetermined value, then it is decided that the main CPU 1 is operating normally, and the logic signals to be given to the first AND gate 12 and second AND gate 13 are all set at a high level to enable the driving of the motor 8 (step S14).

On the other hand, if it is determined that the difference is greater than the predetermined value, it is then decided that abnormality has occurred in the operation of the main CPU 1, and the logic signals to be given to the first AND gate 12 and second AND gate 13 are all set at a low level to initiate a fail-safe operation to disable the driving of the motor 8 (step S15), a CPU failure flag is set to indicate that a failure has occurred in the CPU under monitor (step S16), and then, the process returns to the main routine.

Next, we will describe the watchdog monitoring process that the main CPU 1 performs on the sub CPU 2 and the equivalent process that the sub CPU 2 performs on the main CPU 1. The contents of the watchdog monitoring process are the same between the main CPU 1 and the sub CPU 2.

Figure 5:
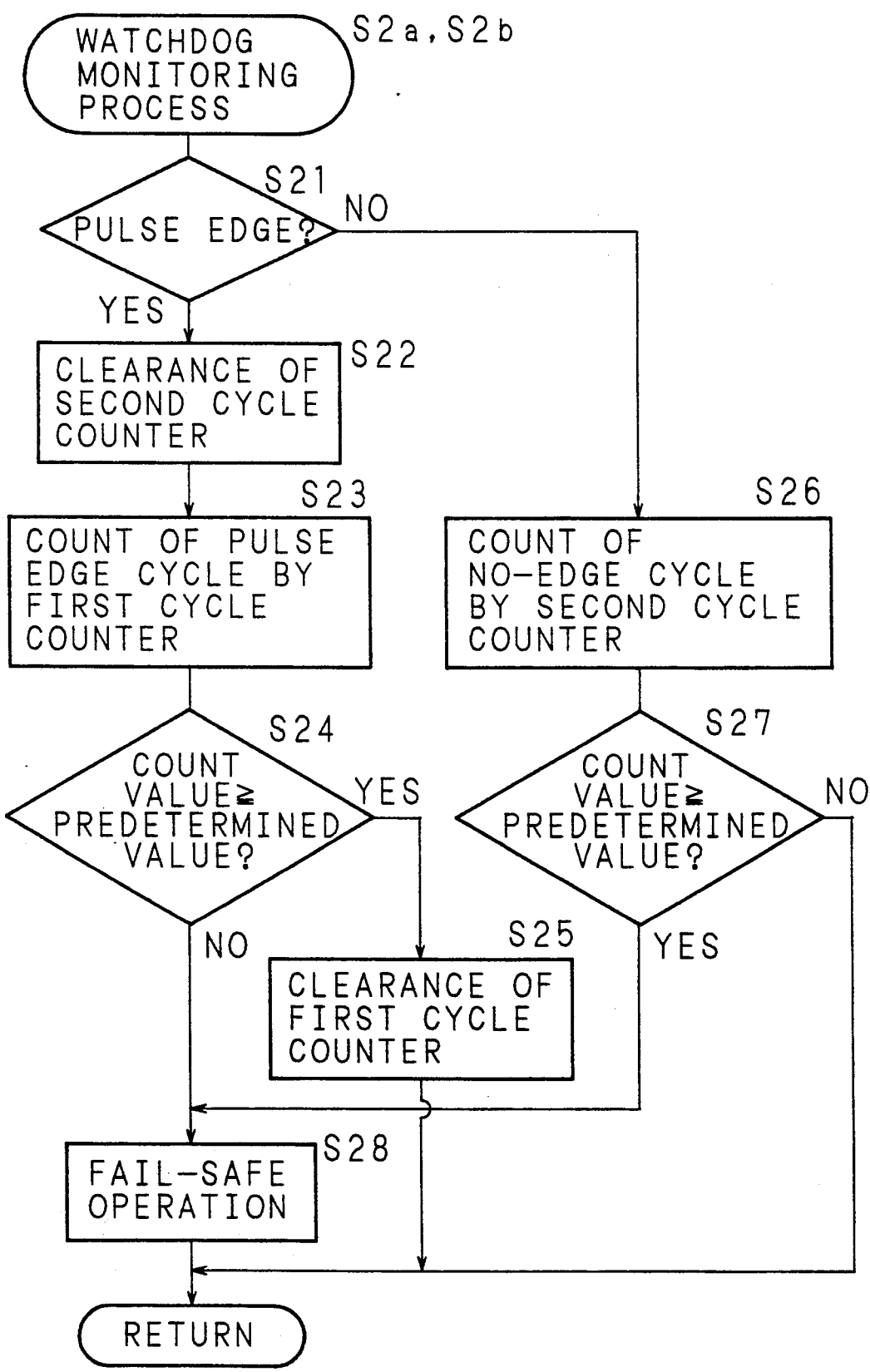
FIG. 5 is a flowchart illustrating a subroutine for a watchdog monitoring process performed in the main and sub CPUs according to the first embodiment of the invention.

FIG. 5 is a flowchart illustrating the processing contents of the watchdog monitoring processing subroutine executed in the main CPU 1 (step S2b) as well as in the sub CPU 2 (step S2a).

First, it is determined whether a pulse edge (the leading or trailing edge of a pulse) is detected in the watchdog pulse signal (step S21); if it is determined that a pulse edge is detected in the watchdog pulse signal, then the count value of a second cycle counter is cleared (step S22), and a first cycle counter is activated to count the cycle of the edge appearing in the watchdog pulse signal (step S23).

Next, it is determined whether the count value of the first cycle counter is not smaller than a predetermined value (step S24). If the count value is determined to be not smaller than the prescribed value in step S24, it means that the frequency of the watchdog pulse signal is at a proper value, and therefore, it is decided that the CPU that is generating the watchdog pulse signal is in a normal operating state. The count value of the first cycle counter is then cleared (step S25), and the process returns to the main routine.

On the other hand, if the count value is determined to be smaller than the predetermined value, it means that the frequency of the watchdog pulse signal is higher than the proper value, and therefore, it is decided that the CPU that is generating the watchdog pulse signal is in an abnormal state. The process then proceeds to step S28 to initiate a fail-safe operation which will be described later.

If, in step S21, it is determined that no edge is detected in the watchdog pulse signal, then the second cycle counter is activated to count the no-edge cycle of the watchdog pulse signal (step S26).

Next, it is determined whether the count value of the second cycle counter is not smaller than a predetermined value (step S27). If the count value is determined to be smaller than the predetermined value in step S27, it means that the frequency of the watchdog pulse signal is at a proper value, and therefore, it is decided that the CPU that is generating the watchdog pulse signal is in a normal operating state. The process then returns to the main routine.

On the other hand, if the count value is determined to be not smaller than the predetermined value in step S27, it means that the frequency of the watchdog pulse signal is higher than the proper value, and therefore, it is decided that the CPU that is generating the watchdog pulse signal is in an abnormal state. The process then proceeds to step S28.

In step S28, a fail-safe operation is performed in which the logic signals to be given to the first AND gate 12 and second AND gate 13 are all set at a low level to disable the driving of the motor 8. After that, the process returns to the main routine.

In this embodiment, to accomplish the fail-safe operation, the logic signals to be given to the first AND gate 12 and second AND gate 13 are all set at a low level to disable the driving of the motor 8, but it will be appreciated that the fail-safe operation may be accomplished in other ways. For example, a reset signal may be given to the abnormal CPU to reset the CPU. Another way to accomplish the fail-safe operation is to mount an electromagnetic clutch on the motor 8 and deenergize the electromagnetic clutch when a failure is detected in the operation of the CPU. Alternatively, a fail-safe relay may be provided on the power supply line in the motor driving circuit 7, the fail-safe relay being deactivated at the time of a CPU failure.

In the electric power steering apparatus having the above control functions, the main CPU 1 and the sub CPU 2 mutually monitor the basic operation of each other for detection of failure on the basis of the watchdog pulse signal that one CPU sends to the other. This eliminates the need for a separate watchdog monitoring circuit which, in the prior art, have had to be provided for each of the main CPU 1 and sub CPU 2. The elimination of hardware such as the watchdog monitoring circuit required in the prior art contributes to a reduction in the production cost of the apparatus having a dual CPU configuration.

Furthermore, when a failure is detected in one or other of the two CPUs, either the steering assistance is disabled or the abnormal CPU is reset. This serves to eliminate the possibility of dangerous steering assisting action that may result from a CPU failure, and thus assures the system safety.

Embodiment 2

In the first embodiment described above, the main CPU and the sub CPU mutually monitor each other for failure by monitoring the watchdog pulse signal that one CPU sends to the other CPU; in this control process, when a failure is detected in the main CPU or sub CPU, the CPU that has detected the failure of the other CPU performs a fail-safe operation, and when the abnormal CPU is restored to a normal operating state, the apparatus is released from the fail-safe operation.

However, if the failure/restoration cycle of one or other CPU is repeated, activating and deactivating the fail-safe operation in a repetitive manner while the vehicle is in motion, the operation of the system will become unstable, introducing instability in the traveling of the vehicle. Unstable operation of the system is particularly dangerous when the vehicle is traveling at high speed.

In the second embodiment described hereinafter, when an abnormal CPU is restored to a normal state, the fail-safe operation, once activated, will not be deactivated until after stopping the vehicle, thereby stabilizing the system operating condition associated with the fail-safe operation.

The configuration of the electric power steering apparatus of the second embodiment is fundamentally the same as that of the foregoing first embodiment (FIG. 1), and therefore, the description of the configuration is omitted herein.

Figure 6:
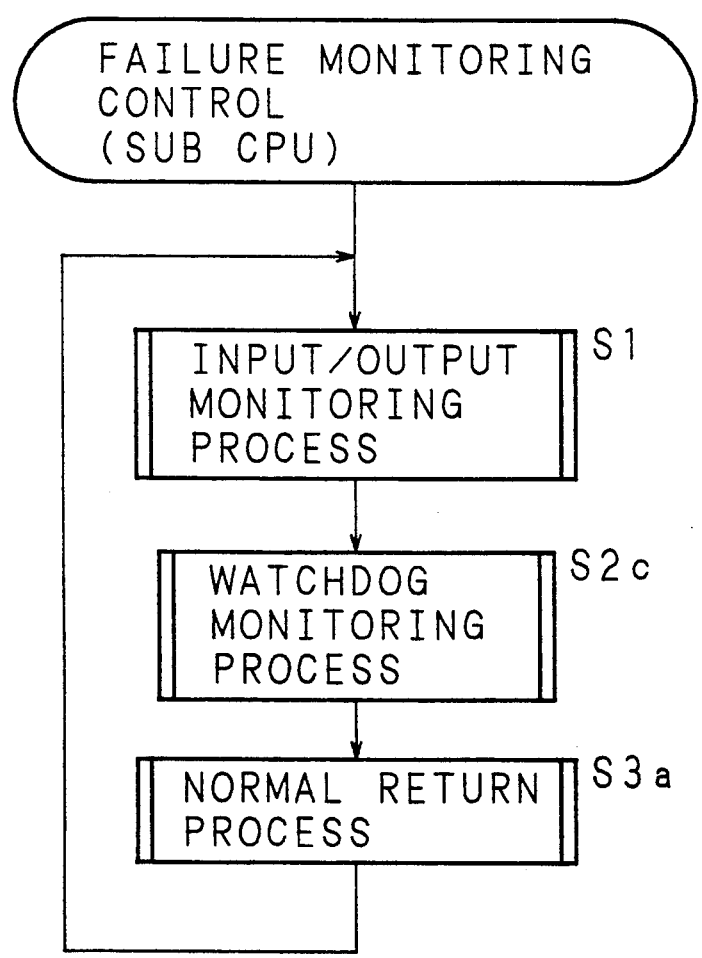
FIG. 6 is a flowchart illustrating a main routine for a failure monitoring control that the sub CPU performs on the main CPU according to the second embodiment of the invention.
Figure 7:
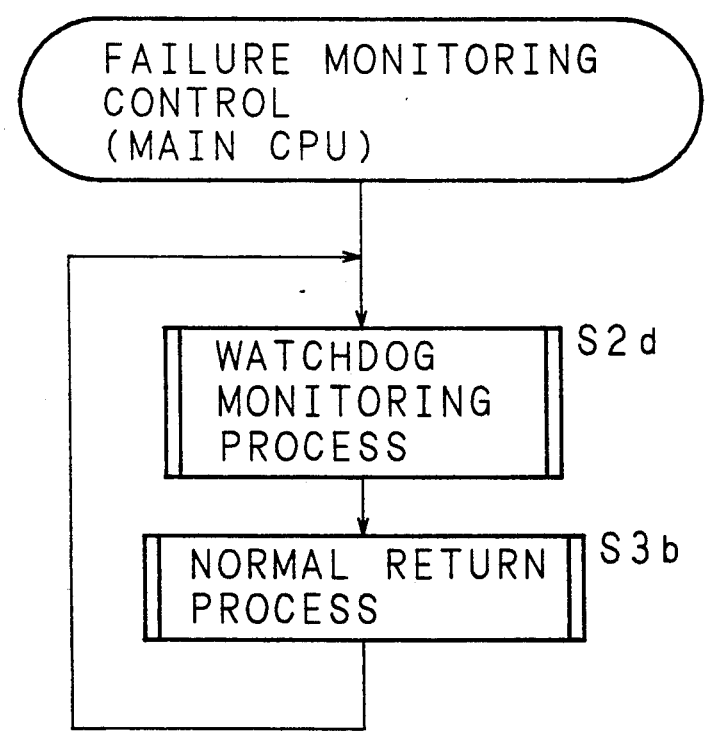
FIG. 7 is a flowchart illustrating a main routine for a failure monitoring control that the main CPU performs on the sub CPU according to the second embodiment of the invention.

The following description deals with the failure monitoring control operations performed by the main CPU 1 and sub CPU 2 in the electric power steering apparatus of the second embodiment. FIG. 6 is a flowchart illustrating a main routine for failure monitoring control that the sub CPU 2 performs on the main CPU 1. The sub CPU 2 sequentially executes a subroutine for an input/output monitoring process (step S1), a subroutine for a watchdog monitoring process (step S2c), and a subroutine for a normal return process (step S3a). FIG. 7 is a flowchart illustrating a main routine for failure monitoring control that the main CPU 1 performs on the sub CPU 2. The main CPU 1 sequentially executes a subroutine for a watchdog monitoring process (step S2d) and a subroutine for a normal return process (step S3b).

The subroutine for an input/output monitoring control (step S1) in the sub CPU 2 is the same as the subroutine for an input/output monitoring control (FIG. 4) in the sub CPU 2 in the foregoing first embodiment, and the description thereof is therefore omitted hereinafter.

Figure 8:
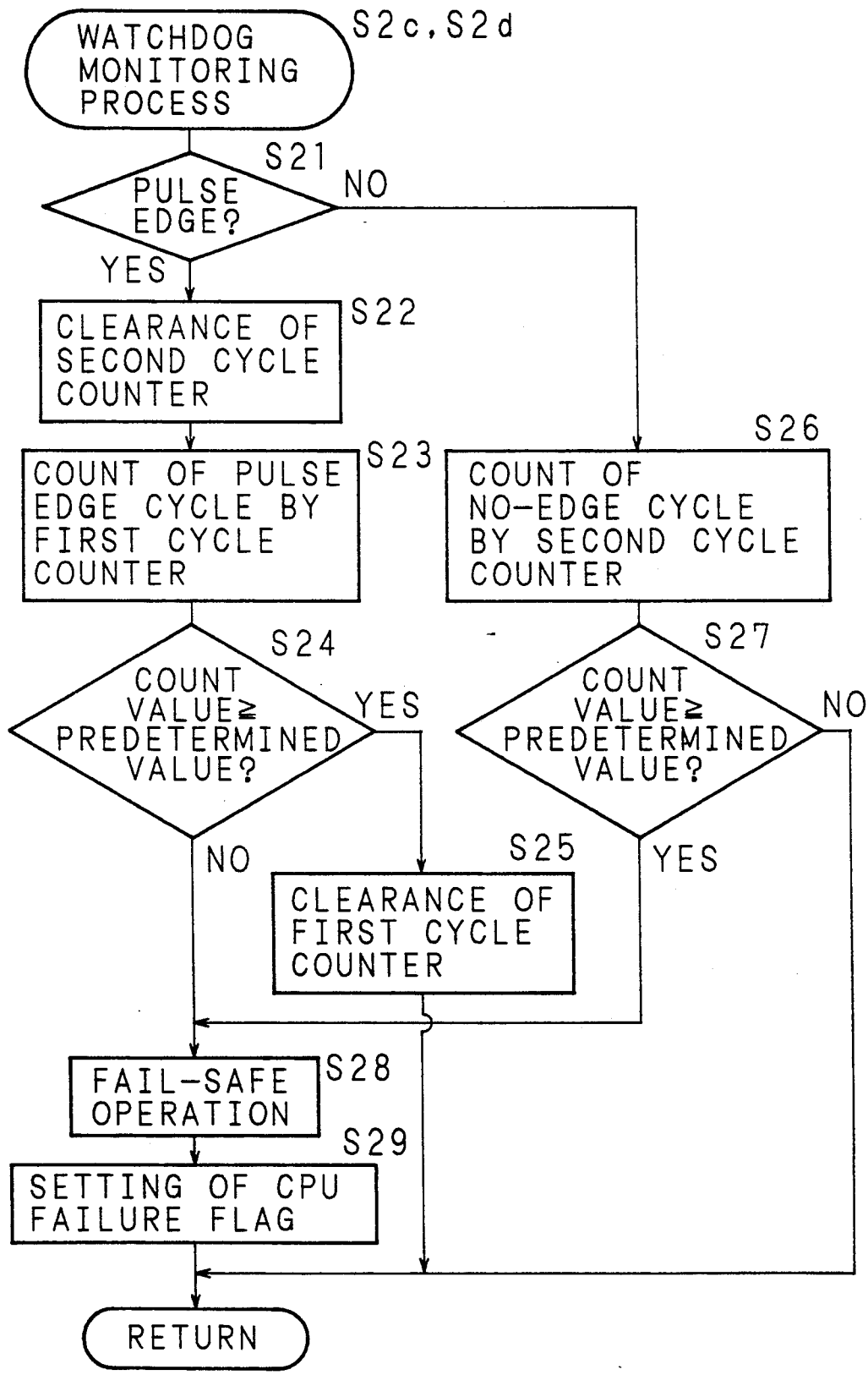
FIG. 8 is a flowchart illustrating a subroutine for a watchdog monitoring process performed in the main and sub CPUs according to the second embodiment of the invention.

FIG. 8 is a flowchart illustrating the processing contents of the watchdog monitoring processing subroutine executed in the main CPU 1 (step S2d) as well as in the sub CPU 2 (step S2c). The watchdog monitoring processing subroutine in the second embodiment is essentially the same as the watchdog monitoring processing subroutine (steps S2a, S2b) in the first embodiment. Therefore, corresponding steps are designated by the same numbers as those in FIG. 5, and description thereof is omitted herein. In the second embodiment, after performing the fail-safe operation in step S28, a CPU failure flag is set to indicate that a failure has occurred in the CPU under monitor (step S29), and then, the process returns to the main routine.

Next, we will describe the normal return processing performed on the sub CPU 2 by the main CPU 1 and the equivalent processing performed on the main CPU 1 by the sub CPU 2. The processing contents are the same between the main CPU 1 and the sub CPU 2.

Figure 9:
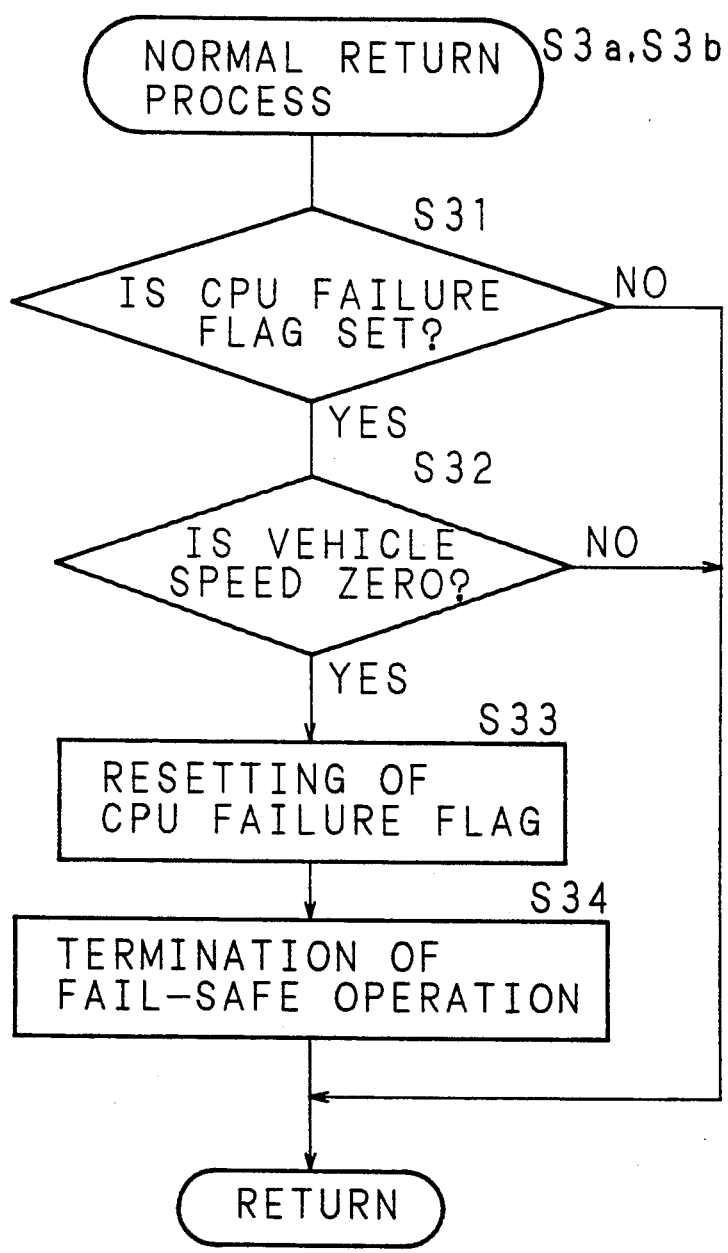
FIG. 9 is a flowchart illustrating a subroutine for a normal return process performed in the main and sub CPUs according to the second embodiment of the invention.

FIG. 9 is a flowchart illustrating the processing contents of the normal return processing subroutine executed in the main CPU 1 (step S3b) as well as in the sub CPU 2 (step S3a).

First, it is determined whether the CPU failure flag is set or not (step S31). If it is determined in step S31 that the CPU failure flag is not set, the process returns to the main routine. On the other hand, if it is determined in step S31 that the CPU failure flag is set, then it is determined whether the detected vehicle speed is at zero or not (step S32).

If it is determined in step S32 that the vehicle speed is not at zero (indicating that the vehicle is in motion), the process returns to the main routine. On the other hand, if it is determined in step S32 that the vehicle speed is at zero (indicating that the vehicle is in a stopped state), then the CPU failure flag is reset (step S33) and the fail-safe operation is terminated (step S34), after which the process returns to the main routine.

In the second embodiment, as well as in the first embodiment, the fail-safe operation may be accomplished either by disabling the driving of the motor 8, by resetting the abnormal CPU, or by deactivating a fail-safe relay at the time of a CPU failure.

In the above failure monitoring control, when a failure has occurred in the CPU under monitor, a fail-safe operation is first performed to disable the steering assistance, and when the CPU under monitor is restored thereafter to a normal operating state, the fail-safe operation is deactivated to release the steering assistance from the disabled state. It should be noted, however, that the fail-safe operation can only be deactivated after detecting the stopped state of the vehicle, to prevent the activation and deactivation of the steering assisting operation from being repeated during the traveling of the vehicle, thus ensuring stable travelling conditions of the vehicle.

As described above, in the electric power steering apparatus of the second embodiment, even when the abnormal CPU is restored to a normal operating state, the steering assistance once disabled, can be released from the disabled state only when the vehicle speed is at zero, so that the steering assisting operation once disabled as a result of a failure of the CPU under monitor will not be restarted during the travelling of the vehicle. This prevents unstable travelling conditions caused by repeatedly activating and deactivating the steering assisting operation with the CPU under monitor failing and then being restored to a normal operating state, and thus serves to stabilize the system operation associated with the fail-safe operation.

Embodiment 3

Generally, in an electric power steering apparatus having a dual CPU configuration, the main CPU performs an operation to obtain the value of a motor driving current from the detected steering torque and vehicle speed, and thereby controls the steering assisting force of the motor. In the meantime, the sub CPU performs the same operation as in the main CPU and compares the operation result with that of the main CPU to monitor the inputs/outputs to and from the main CPU for detection of abnormality in the main CPU. When abnormality in the operation of the main CPU is detected by the sub CPU, the sub CPU performs a fail-safe control, involving the stopping of the motor and so on, to secure the system safety.

However, such an electric power steering apparatus equipped with a dual CPU configuration has the problem of increasing the production cost of the apparatus since the sub CPU responsible for monitoring is required to have a processing capacity equivalent to that of the main CPU. The third embodiment hereinafter described allows the use of a monitoring sub CPU having a lower processing capacity than that of the main CPU by simplifying the operation processing to be performed in the sub CPU.

Generally, in an electric power steering apparatus, the dangerous steering assisting situation that may result from malfunctioning of the CPU for controlling the motor is represented by the following three states: the first state in which steering assisting force is exerted in a steering situation where no steering assisting force is needed; the second state in which steering assisting force is exerted in a direction opposite to the steering direction of the steering wheel; and the third state in which excessive steering assisting force is exerted. Therefore, in the failure monitoring of the main CPU responsible for controlling the motor, it is only necessary to monitor the inputs and outputs to and from the main CPU for the occurrence of any of the above three states. More specifically, when control information on the driving current value indicates a value which does not drop below a predetermined value while the detected steering torque is inside a dead zone, the sub CPU determines the situation as a failure of the main CPU and thus detects the above first state; when control information on the rotating direction of the motor indicates a direction opposite to the direction of the detected steering torque while the detected steering torque is outside the dead zone, the sub CPU determines the situation as a failure of the main CPU and thus detects the second state; and when the driving current is greater than a predetermined value, the sub CPU determines the situation as a failure of the main CPU and thus detects the third state. These monitoring operations by the sub CPU are performed by comparing the information on the inputs and outputs to and from the main CPU, and therefore, can be accomplished by simple operation processing.

Figure 10:
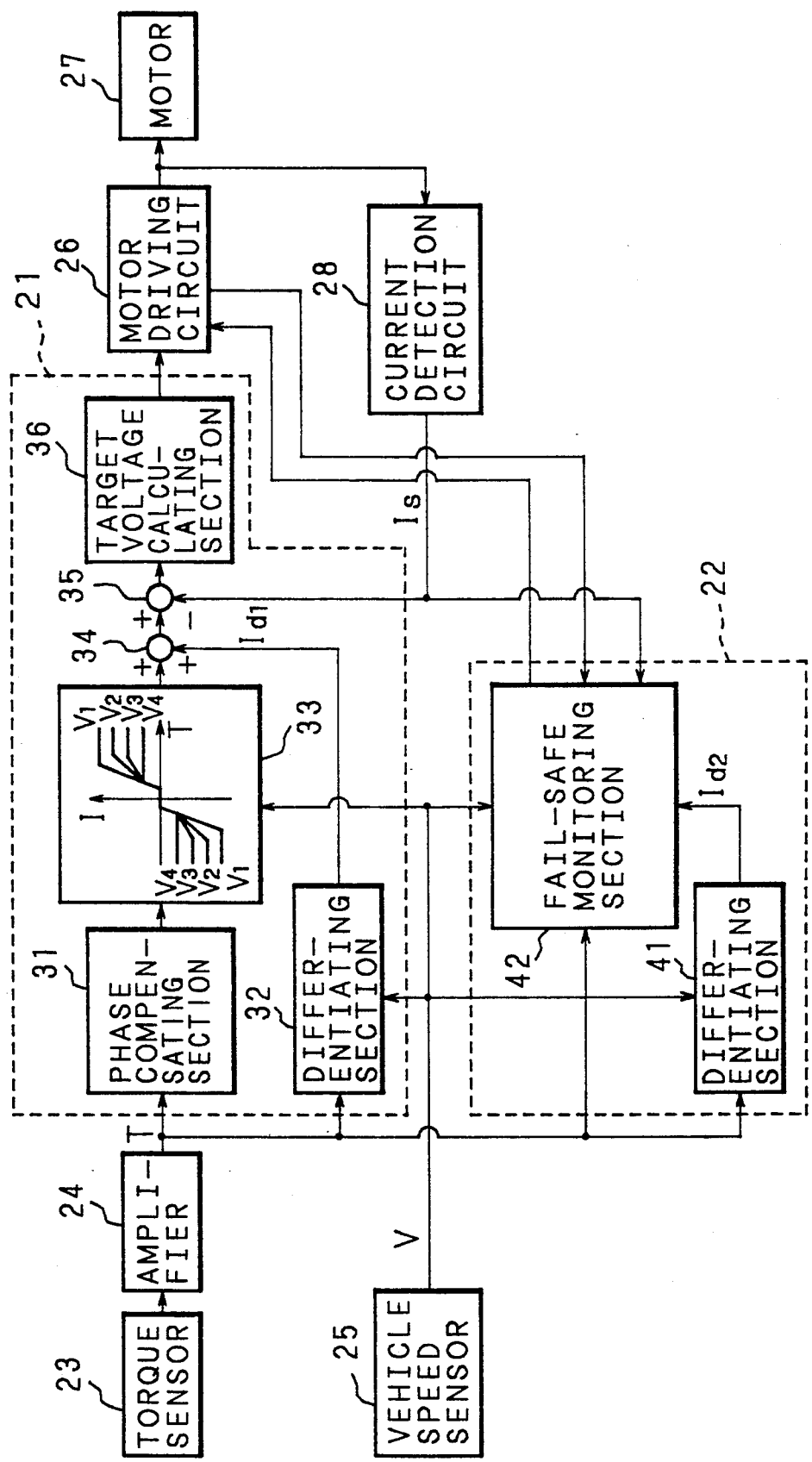
FIG. 10 is a block diagram showing the configuration of an electric power steering apparatus according to a third embodiment of the invention.

FIG. 10 is a block diagram illustrating the configuration of an electric power steering apparatus according to the third embodiment of the invention. The reference numeral 21 designates a main CPU responsible for steering assistance control, and the operating state of the main CPU 21 is monitored by a sub CPU 22.

The steering torque applied at the steering wheel is detected by a torque sensor 23 and amplified through an amplifier 24. The amplified signal, a torque detection signal T, is given to a phase compensating section 31 and a differentiating section 32 in the main CPU 21 as well as to a differentiating section 41 and a fail-safe monitoring section 42 in the sub CPU 22. On the other hand, a vehicle speed detection signal V, which is outputted from a vehicle speed sensor 25 that detects the travelling speed of the vehicle, is given to the differentiating section 32 and a function generating section 33 in the main CPU 21 as well as to the differentiating section 41 and the fail-safe monitoring section 42 in the sub CPU 22.

A current detection circuit 28 detects a driving current for driving a motor 27 for steering assistance and outputs a current detection signal Is which is given to a subtracter 35 in the main CPU 21 as well as to the fail-safe monitoring section 42 in the sub CPU 22. Furthermore, a motor driving direction signal representing the driving direction of the motor 27 is given from a motor driving circuit 26 to the fail-safe monitoring section 42 in the sub CPU 22. The torque detection signal T, vehicle speed detection signal V, and current detection signal Is, supplied to the main and sub CPUs 21 and 22, are analog-to-digital converted by A/D converters (not shown) respectively provided in the main and sub CPUs 21 and 22.

In the main CPU 21, the phase compensating section 31 advances the phase of the torque detection signal T and supplies the torque detection signal T representing a steering torque T to the function generating section 33 which outputs a target current value I, a tentative target value for the motor current.

In the function generating section 33, a function is variably set according to the vehicle speed V (where $V1<V2<V3<V4\ldots$) represented as the vehicle speed detection signal V that is given from the vehicle speed sensor 25, the function being such that, as shown in the figure, in the ranges of the steering torque T outside a predetermined dead zone, the target current value I increases proportionately with increasing steering torque T, the target current value I being saturated when the steering torque T exceeds a predetermined value. The function is set so that as the vehicle speed V1, V2, V3, V4 ... increases, the ratio of the target current value I to the steering torque T decreases, so does the saturation value of the target current I. Using this function, the function generating section 33 determines the target current value I based on the steering torque T and supplies the target current value I to an adder 34.

On the other hand, the differentiating section 32 differentiates the torque detection signal T, multiplies the result by a differential constant that is determined according to the vehicle speed detection signal V, and supplies a differential current value Id1, the resulting product, to the adder 34. The adder 34 adds the target current value I supplied from the function generating section 33 to the differential current value Id1 supplied from the differentiating section 32, and supplies the resulting sum to the subtracter 35.

The subtracter 35 subtracts the current detection value Is, represented as the current detection signal Is detected by the current detection circuit 28, from the sum produced by the adder 34, and supplies the resulting difference to a target voltage calculating section 36. The target voltage calculating section 36 performs a PID operation on the thus supplied difference, and supplies a PWM signal corresponding to the result of the operation to the motor driving circuit 26 for driving the motor 27. The motor driving circuit 26 drives the motor 27 on the basis of the PWM signal.

In the sub CPU 22, the differentiating section 41 differentiates the torque detection signal T, multiplies the result by a differential constant that is determined according to the vehicle speed detection signal V, and supplies a differential current value Id2, the resulting product, to the fail-safe monitoring section 42. Based on the steering torque T, vehicle speed V, differential current value Id2, current detection value Is, and motor driving direction signal, the fail-safe monitoring section 42 performs processing pertaining to the monitoring of control operations in the main CPU 21 as will be described later. When a failure is detected in the operation of the main CPU 21 as a result of the processing, a motor drive disabling signal to disable the driving of the motor 27 is given to the motor driving circuit 26.

Figure 11:
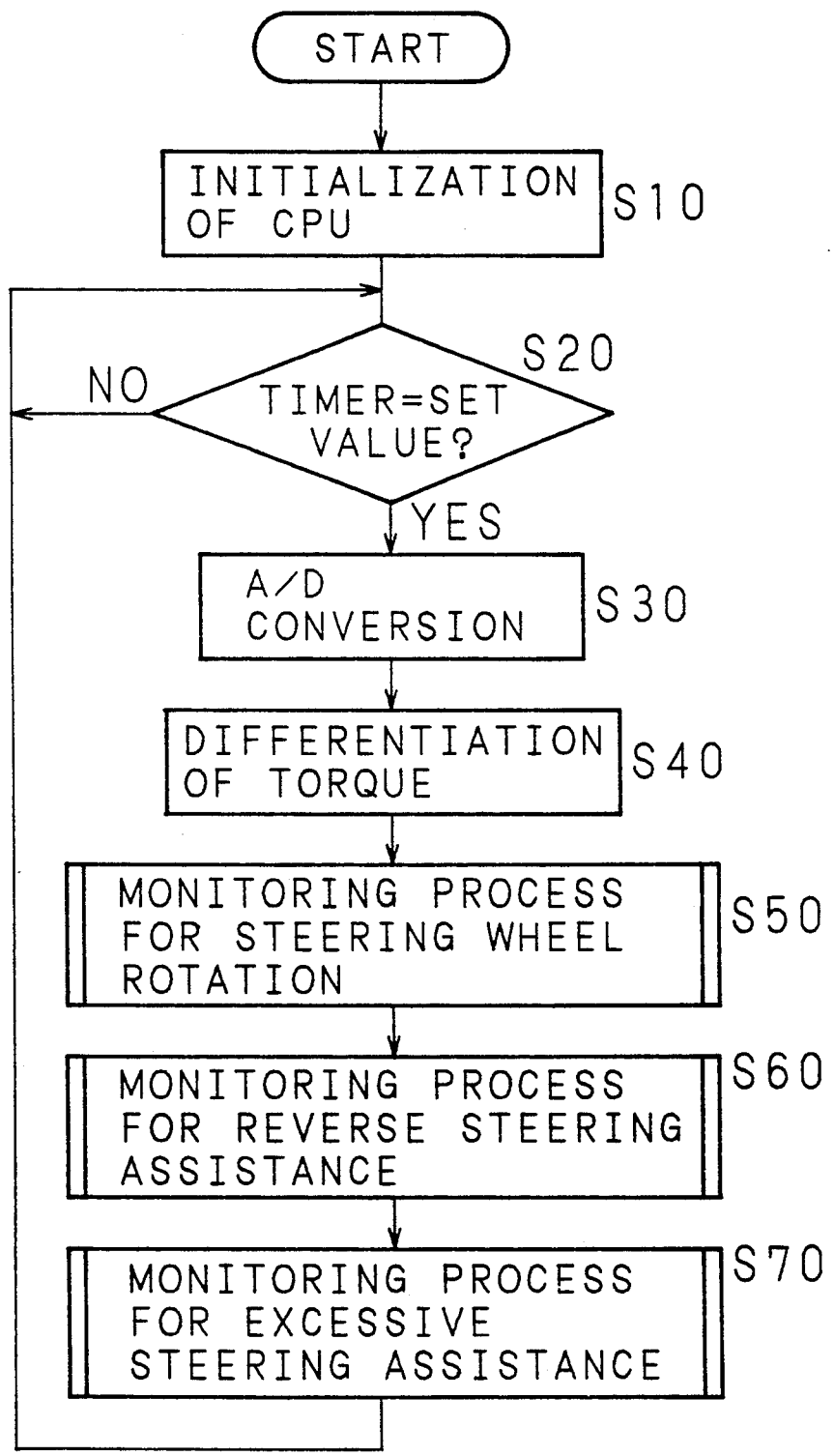
FIG. 11 is a flowchart illustrating a main routine executed in the sub CPU in the third embodiment of the invention.

Next, the operation of the sub CPU 22 will be described. FIG. 11 is a flowchart illustrating the processing contents of the main routine executed in the sub CPU 22.

When the program is started, the memory, register, timer, etc. in the sub CPU 22 are first initialized (step S10). Then, waiting for the timer that sets the operation cycle to count a set value (e.g., 1 msec) (step S20), the input signal (torque detection signal T) is analog-to-digital converted (step S30), and the torque detection signal T is differentiated by the differentiating section 41 (step S40).

Thereafter, the fail-safe monitoring section 42 sequentially executes a subroutine for monitoring the steering wheel rotation (step S50), a subroutine for monitoring for reverse steering assistance (step S60), and a subroutine for monitoring for excessive steering assistance (step S70).

Figure 12:
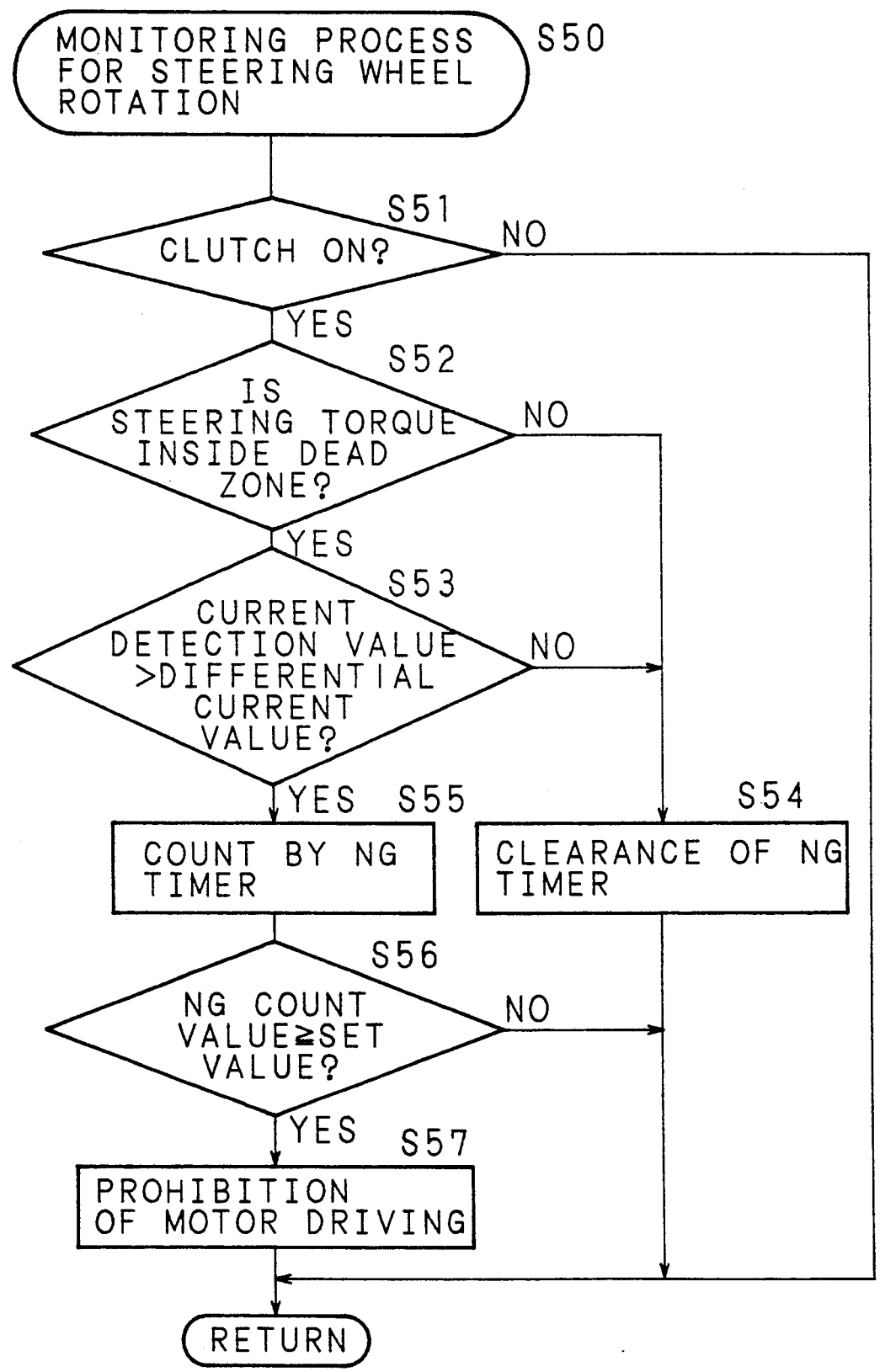
FIG. 12 is a flowchart illustrating a subroutine for a monitoring process for steering wheel rotation in FIG. 11.

The contents of each subroutine will now be described in detail. FIG. 12 is a flowchart illustrating the processing contents of the subroutine for monitoring the steering wheel rotation (step S50).

First, it is determined whether the clutch (not shown) for transmitting the rotational force of the motor 27 to the steering mechanism is engaged or not (step S51). If it is determined in step S51 that the clutch is not engaged, the process returns to the main routine. On the other hand, if it is determined in step S51 that the clutch is engaged, then it is determined whether the steering torque T is inside the dead zone as set in the function generating section 33 (step S52).

If it is determined in step S52 that the steering torque T is not inside the dead zone, the count value of the NG counter that counts the time for execution of the fail-safe operation (to disable the driving of the motor 27) is cleared (step S54), and then, the process returns to the main routine. On the other hand, if it is determined in step S52 that the steering torque T is inside the dead zone, then it is determined whether the current detection value Is is greater than the differential current value Id2 (step S53).

If it is determined in step S53 that the current detection value Is is not greater than the differential current value Id2, the count value of the NG timer is cleared (step S54), and the process returns to the main routine.

On the other hand, if it is determined in step S53 that the current detection value Is is greater than the differential current value Id2, the counting by the NG timer is done (step S55). Next, it is determined whether the count value of the NG timer has reached a prescribed set value (e.g. 20 msec) (step S56).

If it is determined in step S56 that the count value of the NG timer is smaller than the set value, the process returns to the main routine. On the other hand, if it is determined in step S56 that the count value of the NG timer has reached the set value, a motor drive disabling signal is given to the motor driving circuit 26 to disable the driving of the motor 27 (step S57), and the process returns to the main routine.

In the thus structured subroutine for monitoring the steering wheel rotation, when the steering torque T is inside the dead zone, if a driving current greater than the differential current value Id1 (current detection value Is > differential current value Id2) continues to flow into the motor 27 for a length of time equal to or longer than a predetermined length of time, the situation is determined as a failure of the main CPU 21, and control is performed to disable the driving of the motor 27.

Figure 13:
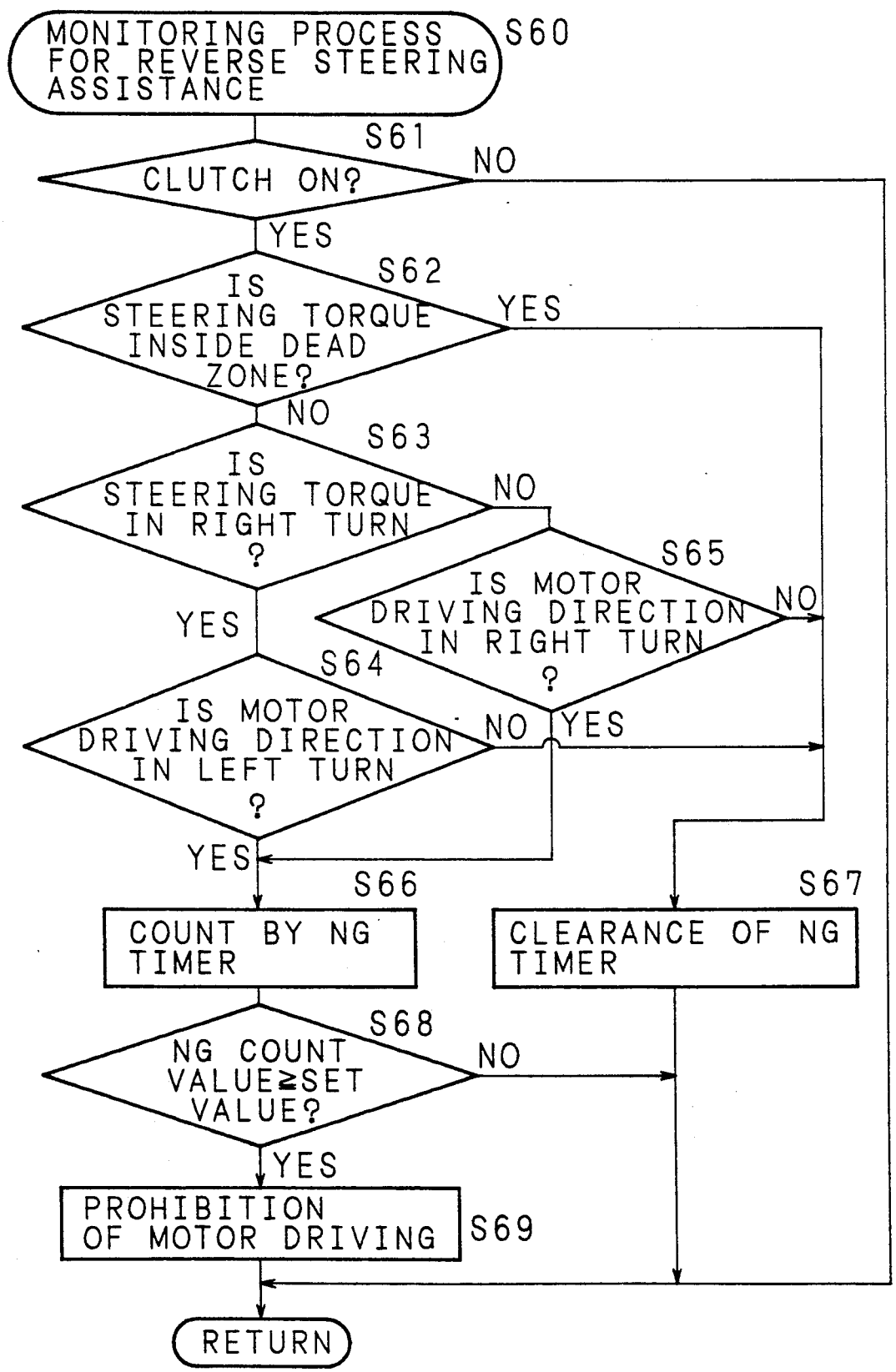
FIG. 13 is a flowchart illustrating a subroutine for a monitoring process for reverse steering assistance in FIG. 11.

FIG. 13 is a flowchart illustrating the processing contents of the subroutine for monitoring for reverse steering assistance (step S60).

First, it is determined whether the clutch (not shown) for transmitting the rotational force of the motor 27 to the steering mechanism is engaged or not (step S61). If it is determined in step S61 that the clutch is not engaged, the process returns to the main routine. On the other hand, if it is determined in step S61 that the clutch is engaged, then it is determined whether the steering torque T is inside the dead zone as set in the function generating section 33 (step S62).

If it is determined in step S62 that the steering torque T is inside the dead zone, the count value of the NG counter that counts the time for execution of the fail-safe operation (to disable the driving of the motor 27) is cleared (step S67), and then, the process returns to the main routine. On the other hand, if it is determined in step S62 that the steering torque T is not inside the dead zone, then it is determined whether the direction of the steering torque T is in a right turn (step S63).

If it is determined in step S63 that the direction of the steering torque T is in a right turn, then it is determined whether the motor driving direction designated by the motor driving direction signal is in a left turn (step S64). On the other hand, if it is determined in step S63 that the direction of the steering torque T is not in a right turn (but in a left turn), then it is determined whether the motor driving direction designated by the motor driving direction signal is in a right turn (step S65).

If it is determined in step S64 that the motor driving direction is in a left turn (the steering assistance direction is opposite to the steering direction), the counting by the NG timer is done (step S66). On the other hand, if it is determined in step S64 that the motor driving direction is not in a left turn (but in a right turn, which means that the steering assistance direction matches the steering direction), the count value of the NG timer is cleared (step S67), and the process returns to the main routine.

If it is determined in step S65 that the motor driving direction is in a right turn (the steering assistance direction is opposite to the steering direction), the counting by the NG timer is done (step S66). On the other hand, if it is determined in step S65 that the motor driving direction is not in a right turn (but in a left turn, which means that the steering assistance direction matches the steering direction), the count value of the NG timer is cleared (step S67), and the process returns to the main routine.

When the counting by the NG timer is done in step S66, it is determined whether the count value of the NG timer has reached a prescribed set value (e.g. 20 msec) (step S68).

If it is determined in step S68 that the count value of the NG timer is smaller than the set value, the process returns to the main routine. On the other hand, if it is determined in step S68 that the count value of the NG timer has reached the set value, a motor drive disabling signal is given to the motor driving circuit 26 to disable the driving of the motor 27 (step S69), and then, the process returns to the main routine.

In the above structured subroutine for monitoring for reverse steering assistance, when the steering torque is outside the dead zone, if the steering assisting force whose direction is opposite to the steering direction is applied for a length of time equal to or longer than a predetermined length of time, the situation is determined as a failure in the operation of the main CPU 21, and control is performed to disable the driving of the motor 27.

Figure 14:
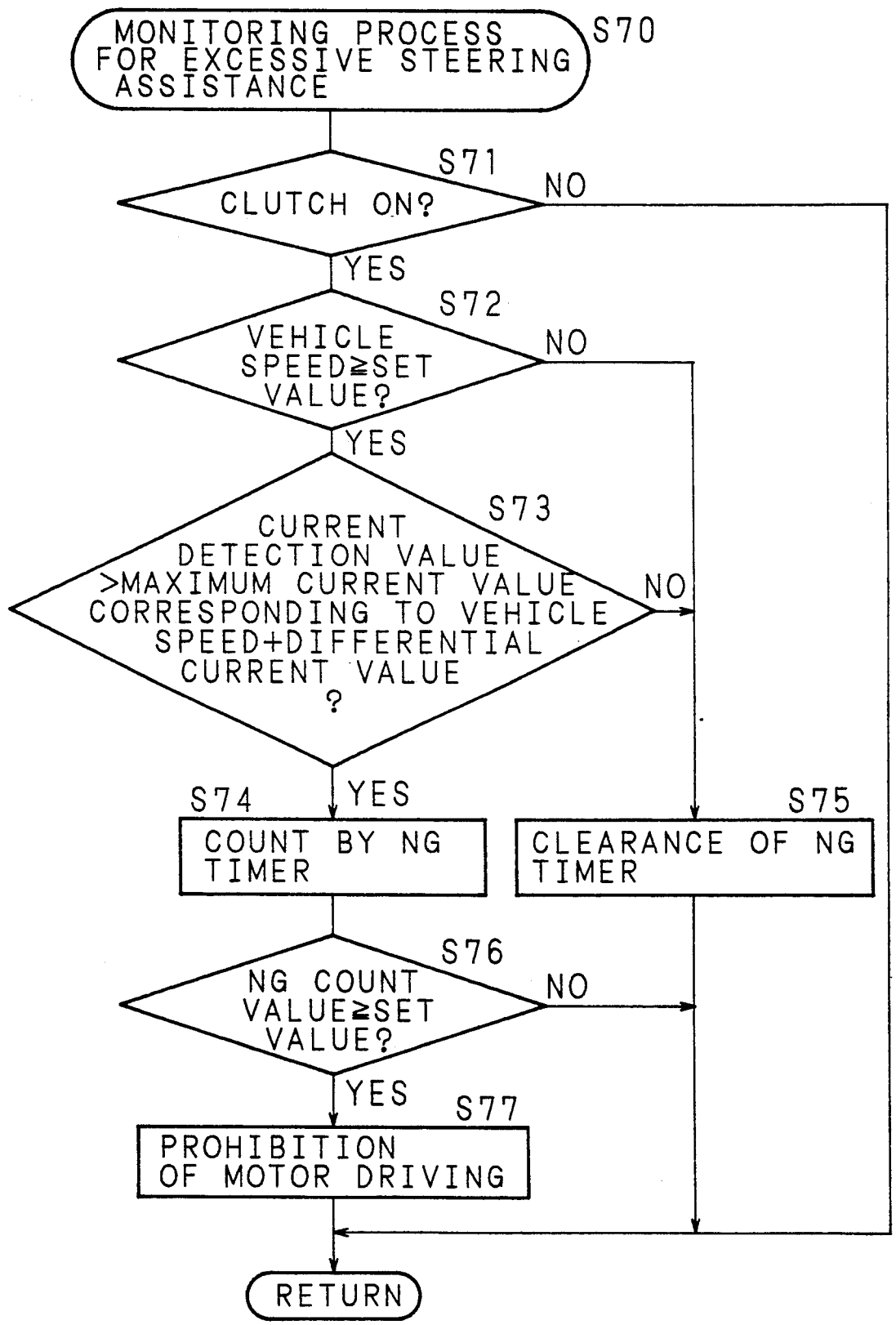
FIG. 14 is a flowchart illustrating a subroutine for a monitoring process for excessive steering assistance in FIG. 11.

FIG. 14 is a flowchart illustrating the processing contents of the subroutine for monitoring for excessive steering assistance (step S70).

First, it is determined whether the clutch (not shown) for transmitting the rotational force of the motor 27 to the steering mechanism is engaged or not (step S71). If it is determined in step S71 that the clutch is not engaged, the process returns to the main routine. On the other hand, if it is determined in step S71 that the clutch is engaged, then it is determined whether the vehicle speed V is greater than a set value (e.g. 40 km/h) (step S72).

If it is determined in step S72 that the vehicle speed V is smaller than the set value, the count value of the NG counter that counts the time for execution of the fail-safe operation (to disable the driving of the motor 27) is cleared (step S75), and then, the process returns to the main routine. On the other hand, if it is determined in step S72 that the car speed V is not smaller than the set value, then it is determined whether the current detection value Is is greater than the sum of the differential current value Id2 and the maximum value of the target current value I determined in the function generating section 33 according to the vehicle speed V (hereinafter referred to as the maximum current value corresponding to vehicle speed) (step S73).

If it is determined in step S73 that the current detection value Is is not greater than the sum of the differential current value Id2 and the maximum current value corresponding to vehicle speed, the count value of the NG timer is cleared (step S75), and the process returns to the main routine.

On the other hand, if it is determined in step S73 that the current detection value Is is greater than the sum of the differential current value Id2 and the maximum current value corresponding to vehicle speed, the counting by the NG timer is done (step S74). Next, it is determined whether the count value of the NG timer has reached a prescribed set value (e.g. 20 msec) (step S76).

If it is determined in step S76 that the count value of the NG timer is smaller than the set value, the process returns to the main routine. On the other hand, if it is determined in step S76 that the count value of the NG timer has reached the set value, a motor drive disabling signal is given to the motor driving circuit 26 to disable the driving of the motor 27 (step S77), and then, the process returns to the main routine.

In the above structured subroutine for monitoring for excessive steering assistance, when the vehicle speed is high, if a motor driving current greater, by more than a predetermined amount, than the maximum current value corresponding to vehicle speed determined in the function generating section 33 according to the car speed (i.e. current detection value Is > differential current value Id2 + maximum current value corresponding to vehicle speed) continues to flow into the motor 27 for a length of time equal to or longer than a predetermined length of time, the situation is determined as a failure in the operation of the main CPU, 21, and control is performed to disable the driving of the motor 27.

Since the fail-safe monitoring section 42 is capable of detecting malfunctioning of the main CPU 21 just by performing the three types of failure monitoring that can be accomplished by simple arithmetic operations involving comparison as described above, the sub CPU 22 is not required to have a processing capacity equivalent to that of the main CPU 21. This contributes to a reduction in the production cost of the electric power steering apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:
   first control means for performing a control relating to a steering assistance and for generating a watchdog pulse signal of a predetermined cycle; and
   second control means for performing a control relating to the steering assistance and for generating a watchdog pulse signal of a predetermined cycle;
   wherein
   said first control means includes means for monitoring the cycle of the watchdog pulse signal generated from said second control means and for detecting abnormality in said second control means on the basis of the monitored result, and said second control means includes means for monitoring the cycle of the watchdog pulse signal generated from said first control means and for detecting abnormality in said first control means on the basis of the monitored result.

2. An electric power steering apparatus as set forth in claim 1, further comprising:
   means for disabling the steering assistance when abnormality is detected in either said first control means or said second control means.

3. An electric power steering apparatus as set forth in claim 1, further comprising;
   means for resetting said first control means or said second control means when abnormality is detected in whichever control means.

4. An electric power steering apparatus, comprising:
   two control means each for performing a control relating to a steering assistance on the basis of the detection of steering torque and vehicle speed, the operating state of one control means being monitored by the other control means;
   means for disabling the steering assistance when one or other of said two control means is determined to be in an abnormal, operating state;
   means for releasing the steering assistance from a disabled state when the abnormal control means is determined to have been restored to a normal operating state;

means for determining whether the detection of vehicle speed is at zero or not; and means for allowing the steering assistance to be released from the disabled state, after the abnormal control means is restored to the normal operating state, only when the detection of vehicle speed is determined to be at zero.

5. An electric power steering apparatus as set forth in claim 4, wherein said two control means each generate a watchdog pulse signal of a predetermined cycle.

6. An electric power steering apparatus as set forth in claim 5, wherein said two control means each monitor the cycle of the watchdog pulse signal generated from the other control means and detect abnormality in said other control means on the basis of the monitored result.

7. An electric power steering apparatus having control means for performing a control relating to a steering assistance, comprising:

means for detecting a steering torque representing the direction and magnitude of the torque applied at a steering wheel;

means for detecting the speed of a vehicle;

a motor for providing a steering assisting force;

first control means for controlling the driving direction of said motor so that the steering assisting force is applied in the direction of the detected steering torque and for controlling a driving current value for said motor so that a driving current corresponding to the magnitude of the detected steering torque and the detected vehicle speed is fed to said motor when the detected steering torque is outside a predetermined dead zone; and second control means for detecting abnormality in said first control means by monitoring the inputs/outputs to and from said first control means and for disabling the driving of said motor when said first control means is determined to be in an abnormal operating state;

wherein said control means includes:

means for determining the occurrence of abnormality in said first control means if control information on said driving current value indicates a value that does not drop below a predetermined value when the detected steering torque is inside the dead zone;

means for determining the occurrence of abnormality in said first control means if control information on the motor driving direction indicates a steering assisting direction opposite to the direction of the detected steering torque when the detected steering torque is outside the dead zone; and means for determining the occurrence of abnormality in said first control means if the driving current value is greater than a predetermined value.

* * * * *